US012579858B2

(12) United States Patent
Dange et al.

(10) Patent No.: US 12,579,858 B2
(45) **Date of Patent: *Mar. 17, 2026**

(54) SYSTEM AND METHOD FOR ANONYMIZED AUTHENTICATED VOTING

(71) Applicant: Amod Ashok Dange, Mountain View, CA (US)

(72) Inventors: Amod Ashok Dange, Mountain View, CA (US); Yash Mody, Mumbai (IN); Gilles Mathieu, Hong Kong (HK)

(73) Assignee: Amod Dange, Mountain View, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 19/050,149

(22) Filed: Feb. 11, 2025

(65) Prior Publication Data

US 2025/0182553 A1 Jun. 5, 2025

Related U.S. Application Data

(63) Continuation-in-part of application No. 18/783,017, filed on Jul. 24, 2024, which is a continuation-in-part
(Continued)

(51) Int. Cl.
*G07C 13/00* (2006.01)
*H04L 9/08* (2006.01)

(52) U.S. Cl.
CPC ............ *G07C 13/00* (2013.01); *H04L 9/0866* (2013.01); *H04L 9/0869* (2013.01)

(58) Field of Classification Search
CPC .......... G06F 21/45; G06F 21/32; G06F 7/588; G06F 222/2117; H04L 9/0866;
(Continued)

(56) References Cited

U.S. PATENT DOCUMENTS

| 7,013,290 B2 | 3/2006 | Ananian |
| 7,340,438 B2 | 3/2008 | Nordman et al. |

(Continued)

FOREIGN PATENT DOCUMENTS

JP 2014127164 A 7/2014

OTHER PUBLICATIONS

Sy et al. "Generation of Cryptographic Keys from Personal Biometrics: An Illustration Based on Fingerprints." dated Nov. 28, 2012, pp. 1-35.
(Continued)

*Primary Examiner* — Daniel St Cyr
(74) *Attorney, Agent, or Firm* — Kevin J Fournier Intellectual Property Legal Services Ltd.; Kevin J Fournier

(57) ABSTRACT

A system and method for anonymized authenticated voting is configured for registering voters using biometric samples to compute a Secret-Key (S1), generating a Unique-Number (N1), and applying a Function (F1) to compute a Public-Key (P1). The system is further configured for storing the Unique-Number (N1) on a voter device and in a data repository, and the Public-Key (P1) in a Voter Registry as a base identifier. For voting, voters are authenticated by capturing a real-time biometric sample to generate Secret-Key (S2), fetching the Public-Key (P1), computing a Real-Time-Unique-Number (N2) using the Public-Key (P1), the Secret-Key (S2), and the Function (F1), and comparing Real-Time-Unique-Number (N2) with Unique-Number (N1). Upon authentication, voters are provided a ballot interface, when their Vote-Status is pending. A second authentication is performed before capturing the voter's choices on the ballot and receiving the submission. The Recorded-Ballot (R1) is saved with Public-Key (P1) in a public database.

13 Claims, 8 Drawing Sheets

Related U.S. Application Data of application No. 17/481,468, filed on Sep. 22, 2021, now Pat. No. 12,072,963, which is a continuation-in-part of application No. 17/018,273, filed on Sep. 11, 2020, now Pat. No. 11,582,032.

(60) Provisional application No. 62/906,080, filed on Sep. 25, 2019, provisional application No. 62/954,591, filed on Dec. 29, 2019, provisional application No. 63/029,717, filed on May 26, 2020.

(58) Field of Classification Search
CPC ....... H04L 9/30; H04L 9/0869; H04L 9/0894; H04L 2209/463; H04L 2209/42; H04L 63/0861; H04L 63/08; G07C 13/00; G07C 9/37; G07C 9/257
See application file for complete search history.

(56) References Cited

U.S. PATENT DOCUMENTS

| | | | |
|---|---|---|---|
| 7,496,191 B1 | 2/2009 | Crews et al. | |
| 7,769,633 B2 | 8/2010 | Jokinen et al. | |
| 8,170,615 B2 | 5/2012 | Vanska et al. | |
| 9,633,269 B2 | 4/2017 | Gu et al. | |
| 10,136,191 B1 | 11/2018 | Lewis et al. | |
| 10,489,826 B2 | 11/2019 | Matthews et al. | |
| 10,530,577 B1 | 1/2020 | Pazhoor et al. | |
| 10,979,225 B1 * | 4/2021 | Shiralkar | H04L 9/3213 |
| 11,252,479 B2 | 2/2022 | Lewis et al. | |
| 11,488,272 B1 * | 11/2022 | McKinzy, Sr. | G06Q 50/265 |
| 12,136,298 B1 * | 11/2024 | Koncz | G07C 13/00 |
| 2003/0028451 A1 | 2/2003 | Ananian | |
| 2003/0135740 A1 | 7/2003 | Talmor et al. | |
| 2006/0085844 A1 | 4/2006 | Buer et al. | |
| 2007/0271463 A1 | 11/2007 | Ginter et al. | |
| 2008/0072068 A1 | 3/2008 | Wang et al. | |
| 2009/0271634 A1 | 10/2009 | Boult et al. | |
| 2011/0197267 A1 * | 8/2011 | Gravel | H04L 9/3226 726/5 |
| 2012/0033807 A1 | 2/2012 | Asim et al. | |
| 2014/0006290 A1 | 1/2014 | Hozanne et al. | |
| 2015/0006895 A1 | 1/2015 | Irvine | |
| 2015/0046699 A1 | 2/2015 | Benteo et al. | |
| 2015/0095999 A1 | 4/2015 | Toth | |
| 2015/0134552 A1 | 5/2015 | Engels et al. | |
| 2015/0269389 A1 | 9/2015 | Lee | |
| 2015/0280921 A1 | 10/2015 | Geoffrey | |
| 2016/0050213 A1 | 2/2016 | Storr | |
| 2016/0219046 A1 | 7/2016 | Ballard et al. | |
| 2017/0141920 A1 | 5/2017 | Herder et al. | |
| 2017/0372059 A1 | 12/2017 | Sindia et al. | |
| 2018/0173871 A1 | 6/2018 | Toth | |
| 2018/0307859 A1 | 10/2018 | LaFever et al. | |
| 2019/0097812 A1 | 3/2019 | Toth et al. | |
| 2019/0182176 A1 | 6/2019 | Niewczas | |
| 2019/0306151 A1 | 10/2019 | Hamel et al. | |
| 2020/0204545 A1 | 6/2020 | Pacella et al. | |
| 2020/0266989 A1 | 8/2020 | KrcMaricic-Barackov et al. | |
| 2020/0296093 A1 | 9/2020 | Hoyos | |
| 2021/0058246 A1 | 2/2021 | Stolbikov et al. | |
| 2021/0091937 A1 | 3/2021 | Dange et al. | |
| 2022/0004613 A1 | 1/2022 | Dange et al. | |
| 2022/0004619 A1 | 1/2022 | Dange et al. | |
| 2022/0004661 A1 | 1/2022 | Dange et al. | |
| 2022/0006815 A1 | 1/2022 | Dange et al. | |
| 2023/0290208 A1 * | 9/2023 | McNulty | G07C 9/37 |
| 2023/0291747 A1 * | 9/2023 | Williams | H04L 63/0861 |

OTHER PUBLICATIONS

Hochrieser, "Online Dating Can Benefit From Identity Verification and Biometric Authentication in 2019", Information Security Buzz, dated Jul. 18, 2019 pp. 1-5.
Arsenova, "Face Liveness Detection for Safe Biometric Authentication and Face Recognition", dated Jan. 27, 2020, pp. 1-10.
M. Kapko et al., "What is Windows Hello? Microsoft's biometrics security system explained" dated Jan. 12, 2021, pp. 1-5.
Mjaaland et al., "Biocryptics: Towards Robust Biometric Public/Private Key Generation", The Norwegian Information Security Conference (NISK) dated 2009, pp. 27-42.
Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.

\* cited by examiner

100

300

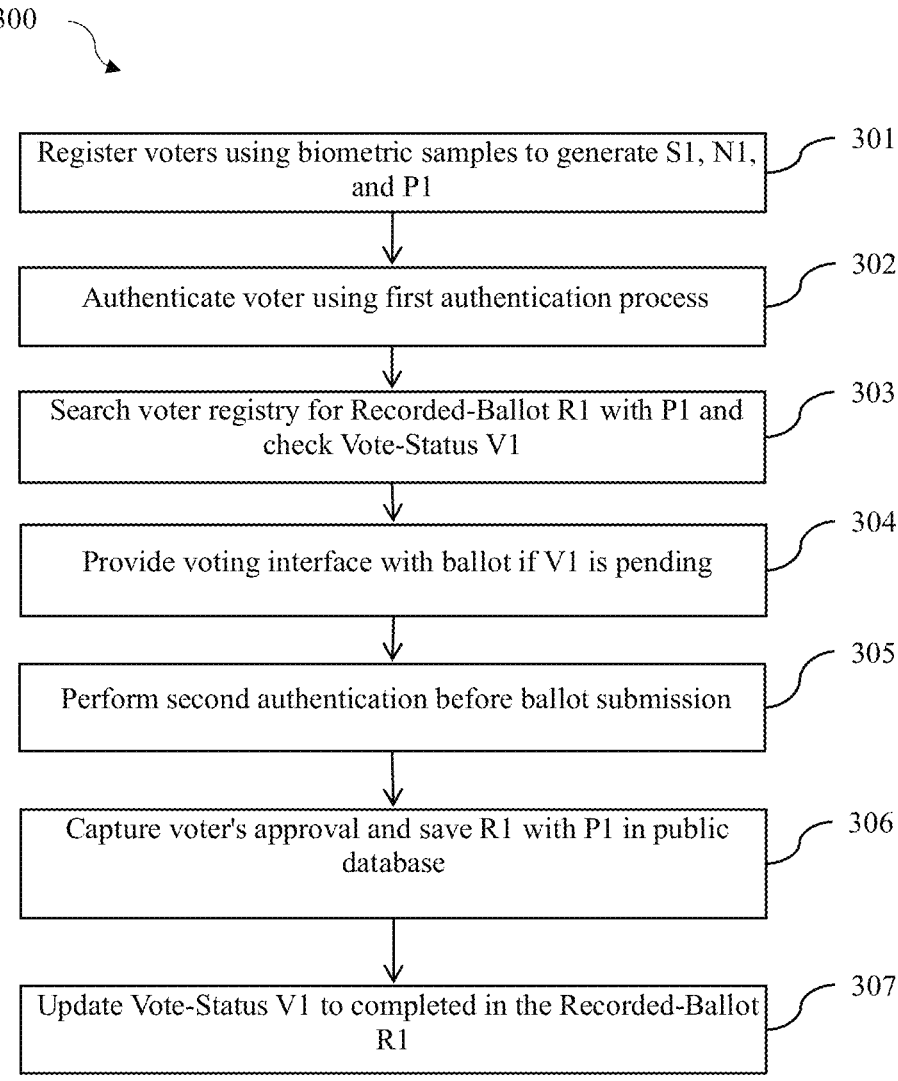

Register voters using biometric samples to generate S1, N1, and P1 — 301

Authenticate voter using first authentication process — 302

Search voter registry for Recorded-Ballot R1 with P1 and check Vote-Status V1 — 303

Provide voting interface with ballot if V1 is pending — 304

Perform second authentication before ballot submission — 305

Capture voter's approval and save R1 with P1 in public database — 306

Update Vote-Status V1 to completed in the Recorded-Ballot R1 — 307

401 — Receive set of biometric samples for one or more biometric factors

402 — Process biometric samples to compute Secret-Key S1

403 — Generate Unique-Number N1 using random number generation algorithm

404 — Apply Function F1 to S1 and N1 to compute Public-Key P1

405 — Store N1 on voter device and in data repository

406 — Store P1 as base identifier in voter registry

500

600

| | |
|---|---|
| Search voter registry to identify Recorded-Ballot R1 corresponding to Public-Key P1 | 601 |
| Check Vote-Status V1 in Recorded-Ballot R1 | 602 |
| Display ballot on voting interface if V1 is pending | 603 |
| Initiate second authentication process before allowing ballot submission | 604 |

700

701

Capture the voter's choices on the ballot and the voter's approval to affix their signature to the ballot

702

Update Vote-Status V1 to completed in the Recorded-Ballot R1

703

Save Recorded-Ballot R1 with voter's Public-Key P1 in public database

800

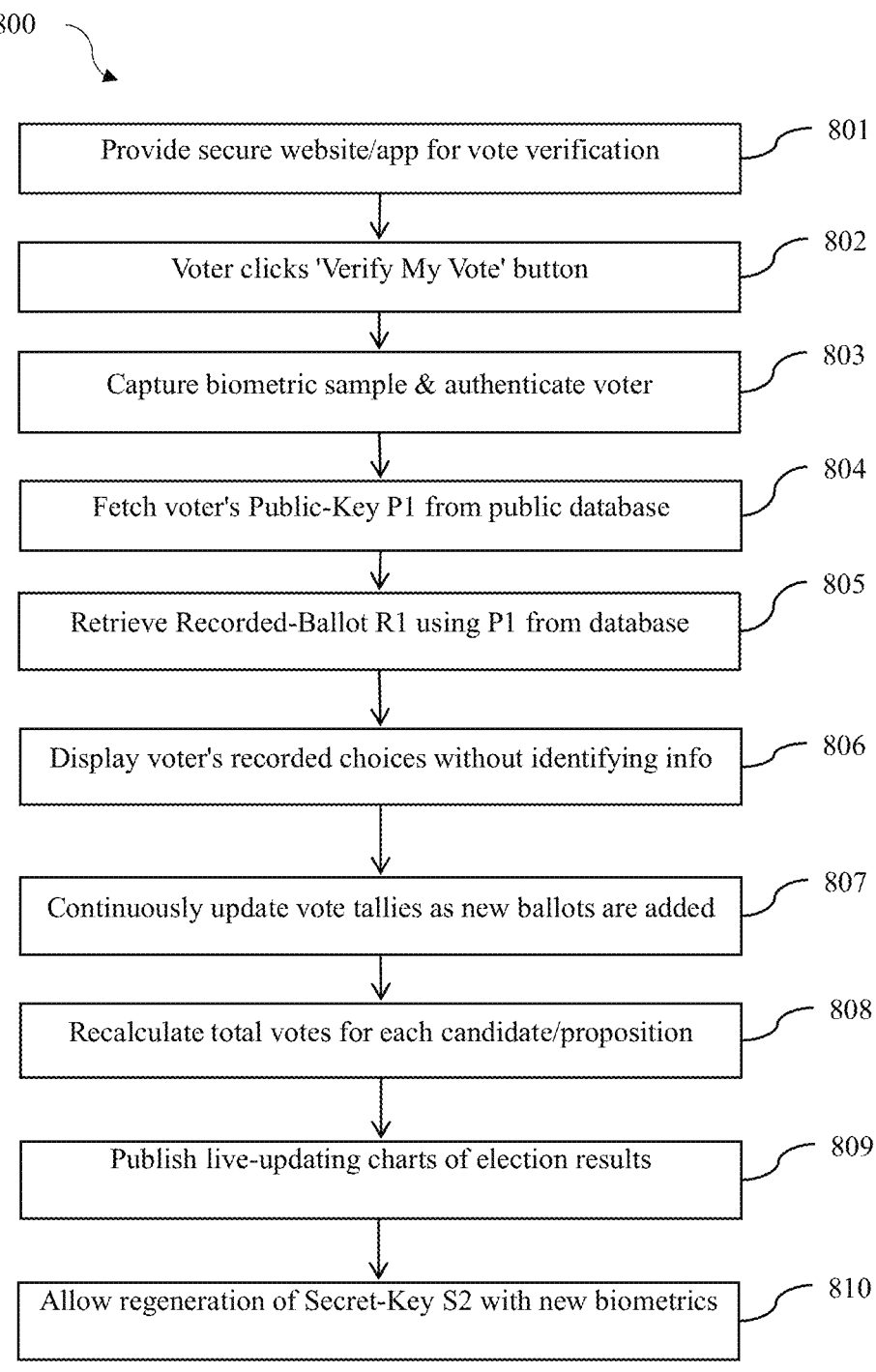

| | |
|---|---|
| Provide secure website/app for vote verification | 801 |
| Voter clicks 'Verify My Vote' button | 802 |
| Capture biometric sample & authenticate voter | 803 |
| Fetch voter's Public-Key P1 from public database | 804 |
| Retrieve Recorded-Ballot R1 using P1 from database | 805 |
| Display voter's recorded choices without identifying info | 806 |
| Continuously update vote tallies as new ballots are added | 807 |
| Recalculate total votes for each candidate/proposition | 808 |
| Publish live-updating charts of election results | 809 |
| Allow regeneration of Secret-Key S2 with new biometrics | 810 |

FIG. 8

SYSTEM AND METHOD FOR ANONYMIZED AUTHENTICATED VOTING

CROSS-REFERENCE TO RELATED APPLICATIONS AND PRIORITY

The present application is a Continuation in Part (CIP) application of U.S. Complete application Ser. No. 18/783, 017, filed on Jul. 24, 2024 entitled "System and method for managing tokenized personally identifiable information", which claims priority from and is a CIP of U.S. Complete application Ser. No. 17/481,468, filed on Sep. 22, 2021 entitled "System and method for affixing a signature using biometric authentication", which claims priority from and is a CIP of US Complete application Ser. No. 17/018,273 filed on Sep. 11, 2020 entitled "System and method for sharing user preferences without having the user reveal their identity", which claims the benefit of U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and also U.S. Provisional Application No. 63/029,717 filed on May 26, 2020 entitled "Method and system of storing identity and signature using the human body as a node."

TECHNICAL FIELD

The present subject matter described herein, in general, relates to a system and a method for secure and privacy-preserving voting processes. More specifically, the present subject matter discloses a system and method for registering voters and securely recording votes while maintaining voter privacy and ballot secrecy.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Voting is a cornerstone of the democratic processes, and ensuring the integrity, security, and privacy of voting systems is of paramount importance. Traditional voting systems, whether paper-based or electronic, face numerous challenges in balancing the need for authentication, anonymity, and verifiability. Paper-based voting systems, while tangible, are susceptible to human error in counting, potential tampering, and lack real-time results. Paper-based voting systems also pose challenges in terms of accessibility for voters with disabilities or those located in remote areas.

Electronic voting systems have attempted to address some of these issues but have introduced new concerns. Many electronic systems struggle to provide a satisfactory level of transparency and verifiability, leading to public distrust. Moreover, centralized electronic systems present attractive targets for cyberattacks, potentially compromising the integrity of entire elections. A critical challenge in electronic voting is maintaining voter anonymity while ensuring that each vote is cast by a legitimate, authenticated voter. Systems that prioritize strong authentication often risk compromising voter privacy, while those focusing on anonymity may be vulnerable to fraudulent voting.

Another significant issue is the ability for voters to verify that their vote has been correctly recorded and counted, without compromising the secrecy of their ballot. This challenge of end-to-end verifiability has been a major hurdle in the adoption of electronic voting systems. Furthermore, existing systems often struggle with providing real-time, transparent vote tallying while maintaining individual vote secrecy. This lack of immediate results can lead to delays in declaring outcomes and can potentially undermine public confidence in the voting process.

The use of biometrics in voting systems has been proposed as a solution for strong authentication, but it raises concerns about the storage and protection of sensitive biometric data. There's a need for a system that can leverage the security benefits of biometrics without storing the actual biometric data, thus protecting voter privacy.

Current systems also face difficulties in maintaining anonymity, and in providing mechanisms for vote delegation or proxy voting in a secure and verifiable manner.

There is a pressing need for a voting system that can address these multifaceted challenges. Such a system must provide strong voter authentication, ensure vote anonymity, enable individual and universal verifiability, resist tampering and fraud, offer transparency in vote counting, and protect voter privacy while remaining accessible and user-friendly.

The present invention addresses these challenges by introducing a novel approach to anonymized authenticated voting, leveraging advanced cryptographic techniques, biometric authentication, and distributed ledger technology to create a secure, transparent, and privacy-preserving voting system.

SUMMARY

This summary introduces concepts related to a system and method for anonymized authenticated voting without revealing voter identities. The concepts are further described in the detailed description. This summary is not intended to identify essential features of the claimed subject matter nor limit its scope.

In one implementation, the system for anonymized authenticated voting comprises a processor and memory, is disclosed. The processor is coupled to the memory and configured to execute instructions stored in the memory for registering each voter, from a set of voters. The process of voter registration comprises steps of receiving a set of biometric samples of the voter, corresponding to one or more biometric factors, processing the set of biometric samples to compute a Secret-Key (S1) corresponding to the voter, and generating a Unique-Number (N1) using a random number generation algorithm. Further, the process of voter registration comprises steps of applying a Function (F1) to the Secret-Key (S1) and the Unique-Number (N1) to compute a Public-Key (P1). The Function (F1) is based on Asymmetric Key Encryption and consumes the Secret-Key (S1) and the Unique-Number (N1) to compute the Public-Key (P1). The Public-Key (P1) is distinct from the Secret-Key (S1). The process of voter registration further comprises steps of storing the Unique-Number (N1) on a voter device and in a data repository, and storing the Public-Key (P1) as a base identifier of the voter, in a Voter Registry. Further, the processor is configured to execute instructions stored in the memory for authenticating the voter via a first authentication process, wherein the first authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device. Further, the processor is configured to execute instructions stored in the memory for searching the Voter Registry to identify a Recorded-Ballot (R1) corresponding to the Public-Key (P1), wherein the Recorded-Ballot (R1) comprises a Vote-Status (V1), wherein the Vote-Status (V1) is either pending or completed. Further, the processor is configured to execute instructions stored in the memory for providing the authenticated voter a Voting-Interface if the Vote-Status (V1) is pending. Further, the processor is configured to execute instructions stored in the memory for displaying, on the Voting-Interface, a ballot and initiating a second authentication process. The second authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device. Further, the processor is configured to execute instructions stored in the memory for capturing via the Voting-Interface, the voter's choices on the ballot and the voter's approval to affix the voter's signature to the ballot, updating the Vote-Status (V1) to completed, and saving the ballot with the affixed voter signature and the voter's Public-Key (P1) in a public database as a Recorded-Ballot (R1).

'In one implementation, a method for anonymized authenticated voting is disclosed. The method comprises steps of registering each voter, from a set of voters. The process of voter registration comprises steps of receiving a set of biometric samples of the voter, corresponding to one or more biometric factors, processing the set of biometric samples to compute a Secret-Key (S1) corresponding to the voter, and generating a Unique-Number (N1) using a random number generation algorithm. Further, the process of voter registration comprises steps of applying a Function (F1) to the Secret-Key (S1) and the Unique-Number (N1) to compute a Public-Key (P1). The Function (F1) is based on Asymmetric Key Encryption and consumes the Secret-Key (S1) and the Unique-Number (N1) to compute the Public-Key (P1). The Public-Key (P1) is distinct from the Secret-Key (S1). The process of voter registration further comprises steps of storing the Unique-Number (N1) on a voter device and in a data repository, and storing the Public-Key (P1) as a base identifier of the voter, in a Voter Registry. Further, the method comprises steps of authenticating the voter via a first authentication process, wherein the first authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device. Further, the method comprises steps of searching the Voter Registry to identify a Recorded-Ballot (R1) corresponding to the Public-Key (P1), wherein the Recorded-Ballot (R1) comprises a Vote-Status (V1), wherein the Vote-Status (V1) is either pending or completed. Further, the method comprises steps of providing the authenticated voter a Voting-Interface if the Vote-Status (V1) is pending. Further, the method comprises steps of displaying, on the Voting-Interface, a ballot and initiating a second authentication process. The second authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device. Further, the method comprises steps of capturing via the Voting-Interface, the voter's choices on the ballot and the voter's approval to affix the voter's signature to the ballot, updating the Vote-Status (V1) to completed, and saving the ballot with the affixed voter signature and the voter's Public-Key (P1) in a public database as a Recorded-Ballot (R1).

In one implementation, a computer program product for anonymized authenticated voting is disclosed. The computer program product comprises a non-transitory computer-readable storage medium having program instructions embodied therewith. The program instructions are executable by one or more processors to cause the one or more processors to perform operations comprising registering each voter, from a set of voters. The process of voter registration comprises steps of receiving a set of biometric samples of the voter, corresponding to one or more biometric factors, processing the set of biometric samples to compute a Secret-Key (S1) corresponding to the voter, and generating a Unique-Number (N1) using a random number generation algorithm. Further, the process of voter registration comprises steps of applying a Function (F1) to the Secret-Key (S1) and the Unique-Number (N1) to compute a Public-Key (P1). The Function (F1) is based on Asymmetric Key Encryption and consumes the Secret-Key (S1) and the Unique-Number (N1) to compute the Public-Key (P1). The Public-Key (P1) is distinct from the Secret-Key (S1). The process of voter registration comprises steps of storing the Unique-Number (N1) on a voter device and in a data repository, and storing the Public-Key (P1) as a base identifier of the voter, in a Voter Registry. Further, the operations comprise steps of authenticating the voter via a first authentication process, wherein the first authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device. Further, the operations comprise steps of searching the Voter Registry to identify a Recorded-Ballot (R1) corresponding to the Public-Key (P1), wherein the Recorded-Ballot (R1) comprises a Vote-Status (V1), wherein the Vote-Status (V1) is either pending or completed. Further, the operations comprise steps of providing the authenticated voter a Voting-Interface if the Vote-Status (V1) is pending. Further, the operations comprise steps of displaying, on the Voting-Interface, a ballot and initiating a second authentication process. The second authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device. Further, the operations comprise steps of capturing via the Voting-Interface, the voter's choices on the ballot and the voter's approval to affix the voter's signature to the ballot, updating the Vote-Status (V1) to completed, and saving the ballot with the affixed voter signature and the voter's Public-Key (P1) in a public database as a Recorded-Ballot (R1).

BRIEF DESCRIPTION OF DRAWINGS

The detailed description is described with reference to the accompanying Figures. The same numbers are used throughout the drawings to refer to features and components.

FIG. 3 illustrates a method 300 for anonymized authenticated voting, in accordance with an embodiment of the present disclosure.

FIG. 8 illustrates a method 800 for vote verification and real-time vote counting, while maintaining voter privacy, in accordance with an embodiment of the present disclosure.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
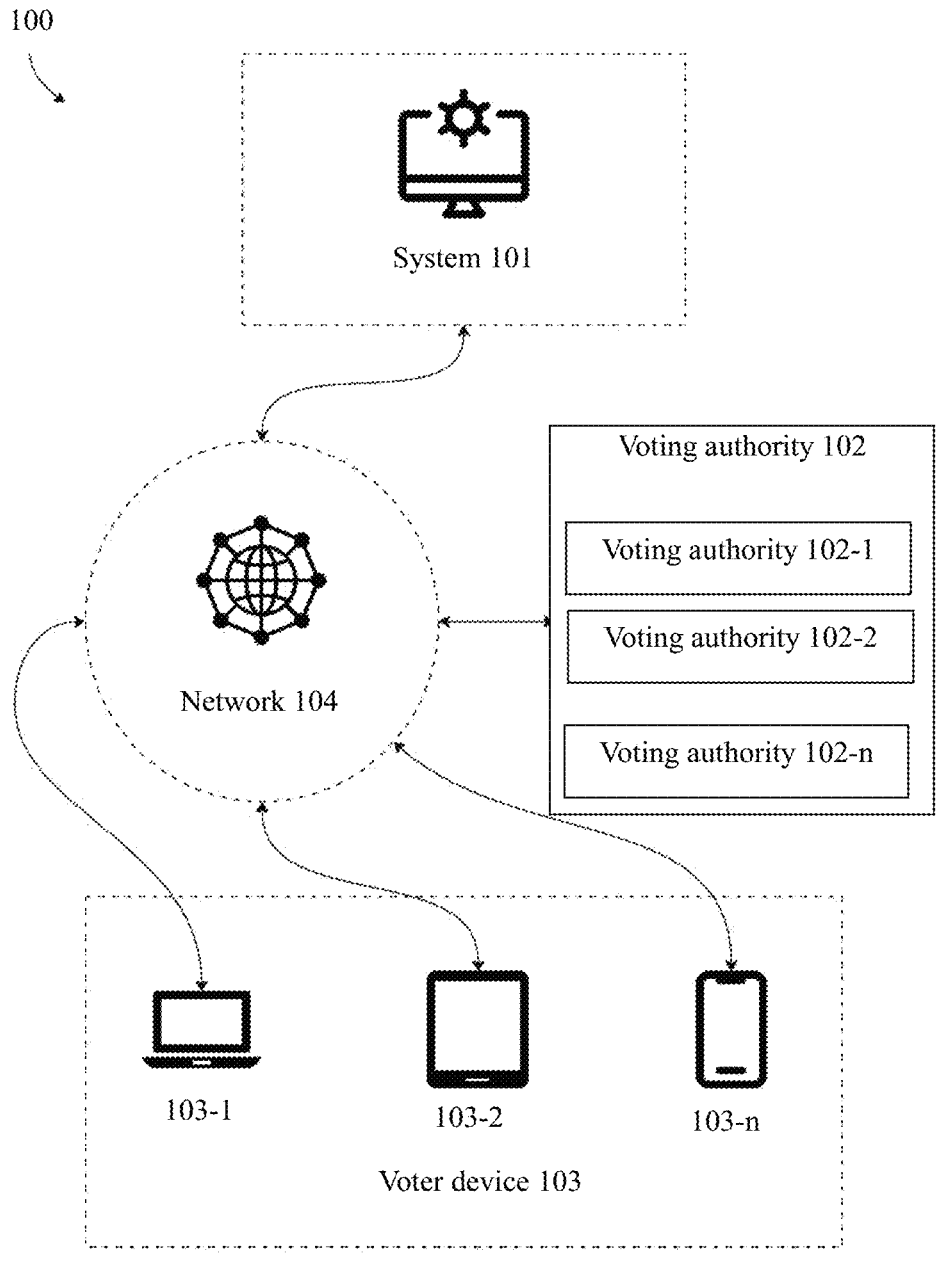
FIG. 1 illustrates a network implementation 100 of a System 101 for anonymized authenticated voting, in accordance with an embodiment of the present disclosure.

Referring to FIG. 1, implementation 100 of System 101 for anonymized authenticated voting is illustrated, in accordance with an embodiment of the present subject matter. In one embodiment, the System 101 may comprise a processor and a memory. Further, the System 101 may be connected to voter devices and voting authorities through a network 104. It may be understood that the System 101 may be communicatively coupled with multiple voters through one or more voter devices 103-1, 103-2, 103-3 . . . , 103-$n$ and voting authorities 102-1, 102-2, 102-3 . . . , 102-$n$ collectively referred to as a voter device 103 and voting authority 102. The voting authority 102 may organize one or more elections in an online or offline mode. The System 101 is configured to register voters, authenticate voters, provide secure Voting-Interfaces, record votes in a public database, and enable vote verification, all while preserving voter anonymity through the use of biometric-based cryptographic techniques.

In one embodiment, the network 104 may be a cellular communication network used by voter devices 103 such as mobile phones, tablets, or other biometric-enabled devices. In one embodiment, the network may be the Internet. The voter device 103 may be any electronic device with biometric scanning capabilities, communication capabilities, and secure storage. Further, the voting authority 102 may be any government entity, election commission, or authorized organization responsible for conducting elections. The System 101 may be configured to register voters over the System 101. Further, the System 101 may be configured to authenticate the voter each time the voter makes a request to access the System 101, using biometric data and cryptographic techniques.

In one embodiment, the voter devices 103 may support communication over one or more types of networks in accordance with the described embodiments. For example, some voter devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned voter devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the voter devices 103 are equipped with biometric scanning capabilities, such as facial recognition cameras, fingerprint scanners, or other biometric sensors. Furthermore, the voter devices 103 are also enabled to securely store and process cryptographic keys. The voter devices 103 are configured for storing the Unique-Number (N1) and Public-Key (P1) used in the authentication process. The System 101 maintains a Voter Registry, which is a secure database that stores the Public-Key (P1) of every registered voter, serving as their base identifier.

In one embodiment, the voting authority 102 may be responsible for initiating and overseeing the voting process, including voter registration, election setup, and result certification. The System 101 supports all voters equally, allowing them to register, authenticate, and cast their votes securely and anonymously. The System 101 is configured to register voters, authenticate voters using biometric data, provide secure Voting-Interfaces, record votes in a public database, and enable vote verification, all while preserving voter anonymity. The public database may be implemented as a blockchain. The System 101 is designed to maintain voter privacy throughout the entire voting process, allowing voters to cast their votes without revealing their identity. Further, the System 101 also supports vote tallying and result verification while maintaining voter privacy. The process of voter registration and the voting process are further illustrated with the block diagram in FIG. 2.

Figure 2:
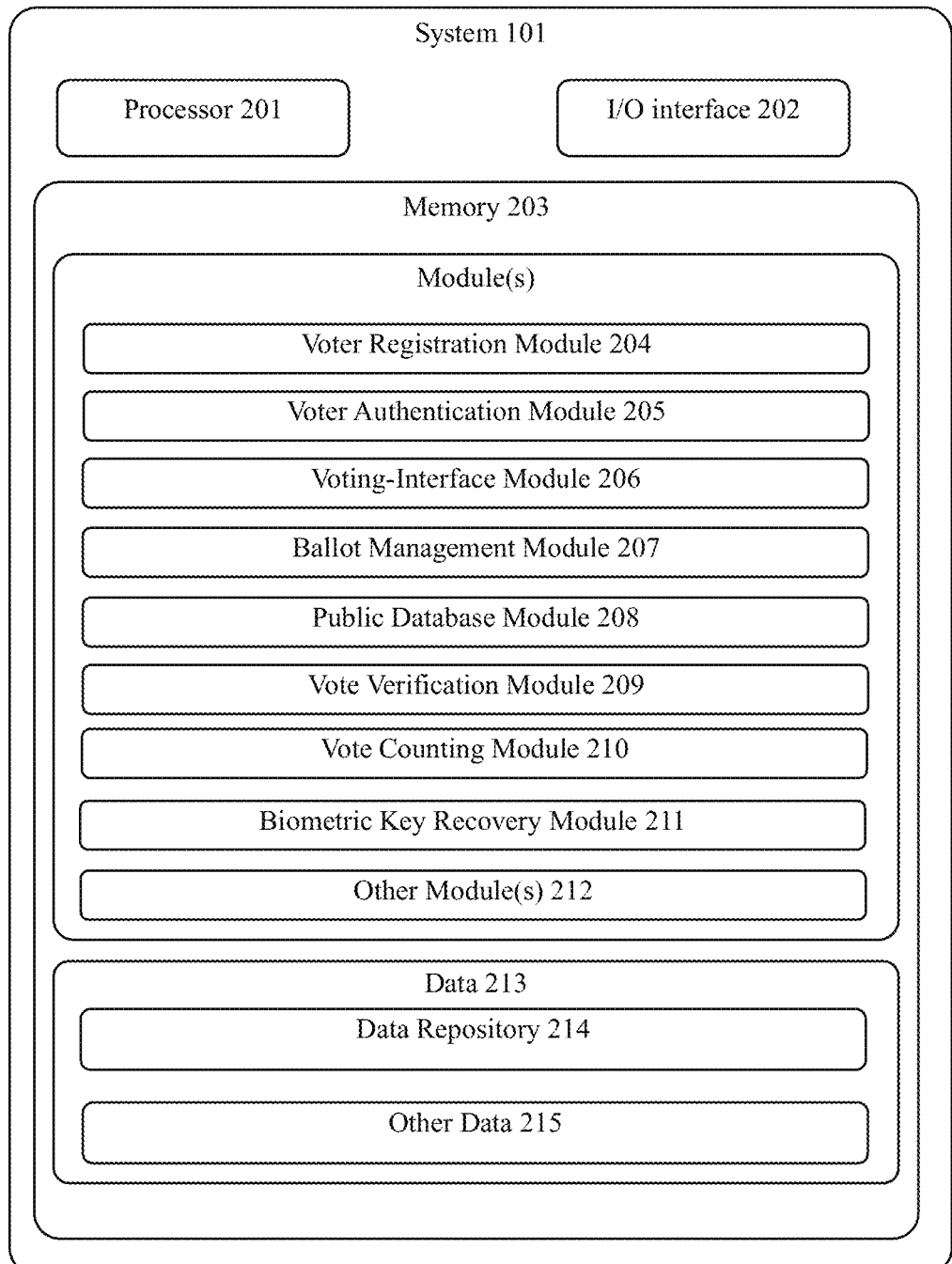
FIG. 2 illustrates components of the System 101 for anonymized authenticated voting, in accordance with an embodiment of the present disclosure.

Referring now to FIG. 2, various components of the System 101 are illustrated, in accordance with an embodiment of the present subject matter. As shown, the System 101 may include at least one processor 201 and a memory 203. The memory consists of a set of modules. The set of modules may include a Voter Registration Module 204, a Voter Authentication module 205, a Voting-Interface Module 206, a Ballot Management Module 207, a Public Database Module 208, a Vote Verification Module 209, a Vote Counting Module 210, a Biometric Key Recovery Module 211, and Other Module(s) 212. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions may include routines, programs, objects, components, data structures, etc., which perform particular tasks, functions, or implement particular abstract data types. The data 213 may comprise a data repository 214, and other data 215. The other data 215, amongst other things, serves as a repository for storing data processed, received, and generated by one or more components and programmed instructions. The data repository 214 may include the Voter Registry and the public database for storing cast ballots.

The working of the System 101 will now be described in detail referring to FIGS. 1 and 2.

In one embodiment, the Voter Registration Module 204 is responsible for registering each voter from a set of voters. The Voter Registration Module 204 begins by receiving a set of biometric samples from the voter, corresponding to one or more biometric factors such as face, voice, retina, fingerprint, palm vein and the like. These samples are then processed to compute a Secret-Key (S1) unique to the voter. The Voter Registration Module 204 then generates a Unique-Number (N1) using a random number generation algorithm. Following this, the Voter Registration Module 204 applies a Function (F1) to the Secret-Key (S1) and the Unique-Number (N1) to compute a Public-Key (P1). This function is based on Asymmetric Key Encryption and consumes both Secret-Key (S1) and Unique-Number (N1) to produce Public-Key (P1), ensuring that Public-Key (P1) is distinct from Secret-Key (S1). The Voter Registration Module 204 then stores the Unique-Number (N1) on the voter's device and in a data repository, while the Public-Key (P1) is stored as the voter's base identifier in a Voter Registry.

In one embodiment, the Voter Authentication Module 205 is designed to authenticate voters based on their base identifier and a robust authentication process. When a voter attempts to access the system, the Voter Authentication Module 205 prompts the voter to provide a real-time biometric sample. This sample is processed to generate a new Secret-Key (S2). The module then fetches the Public-Key (P1) corresponding to the voter from their device. Using Public-Key (P1), Secret-Key (S2), and the Function (F1), the Voter Authentication Module 205 computes a Real- Time-Unique-Number (N2). This number is then compared with the Unique-Number (N1) stored on the voter's device. If they match, the voter is authenticated. The Voter Authentication Module 205 also performs liveness detection on the real-time biometric sample to prevent spoofing attempts using static images or pre-recorded videos. The voter's approval to affix the voter's signature to the ballot and the voter's choices on the ballot is captured, via the Voting-Interface, upon click event of a Signature-Button on the Voting-Interface. The voter's signature consists of a combination of the Button-Click-Event-Log corresponding to the Signature-Button and the Real-Time-Unique-Number (N2).

In one embodiment, the Voting-Interface Module 206 is responsible for providing authenticated voters with access to their ballot. The Voting-Interface Module 206 begins by searching the Voter Registry to identify a Recorded-Ballot (R1) corresponding to the voter's Public-Key (P1). The Recorded-Ballot (R1) contains a Vote-Status (V1), which is either pending or completed. If V1 is pending, the Voting-Interface Module 206 displays the appropriate ballot on the Voting-Interface. Before allowing ballot submission, the Voting-Interface Module 206 initiates a second authentication process, identical to the first, to ensure the voter's identity at the point of casting the vote.

In one embodiment, the Ballot Management Module 207 handles the process of capturing and recording the voter's ballot. Once the voter has made their choices, the Ballot Management Module 207 captures the voter's approval to affix their signature to the ballot. This signature is a cryptographic operation using the voter's Public-Key (P1).

In one embodiment, the Public Database Module 208 is responsible for securely storing cast ballots. The Public Database Module 208 saves the ballot with the affixed voter signature and the voter's Public-Key (P1) in a public database. The Recorded-Ballot (R1) may be implemented as a blockchain.

In one embodiment, the Vote Verification Module 209 allows voters to verify that their vote was correctly recorded. The Vote Verification Module 209 provides an Interface where voters can input their Public-Key (P1). Using this key, the Vote Verification Module 209 retrieves the corresponding Recorded-Ballot (R1) from the public database and displays the ballot details to the voter without revealing their identity to others.

In an embodiment, the Function (F1) may implement Asymmetric Key Encryption using elliptic curve cryptography (ECC). Specifically, Function (F1) may use the Secret-Key (S1) as the private key input and combine it with the Unique-Number (N1) through point multiplication on the selected elliptic curve. The Secret-Key (S1) acts as the scalar multiplier while the Unique-Number (N1) is used to derive the base point on the curve. This multiplication results in a point on the curve that becomes the Public-Key (P1). The one-way nature of ECC ensures that even with knowledge of P1 and N1, it remains computationally infeasible to derive S1, thereby maintaining the security of the biometric-derived secret key while enabling reliable authentication through the derived public key.

In an embodiment, the Recorded-Ballot (R1) may be structured as a JSON object containing the following fields: ballot_id (a unique identifier), public_key (the voter's Public-Key P1), vote_status (either 'pending' or 'completed'), timestamp (time of creation/last update), vote_data (encrypted ballot choices), and digital_signature (computed using the voter's Secret-Key S2). The vote_data field may remain null until the ballot is completed, ensuring no partial votes are recorded.

Furthermore, the Vote-Status (V1) transitions may be managed through atomic database operations to prevent race conditions. When a voter initiates voting, the status changes from 'pending' to 'in-progress' with a timeout mechanism. Upon successful ballot submission and second authentication, an atomic transaction updates both the Vote-Status to 'completed' and records the ballot data. If the voting session times out or fails, the status reverts to 'pending' allowing the voter to retry.

In one embodiment, the Vote Counting Module 210 manages the tallying and reporting of votes. The Vote Counting Module 210 continuously updates voting results recorded in the public database, updating vote counts and percentages for each candidate or option in real-time. The Vote Counting Module 210 ensures that these aggregated results are published without compromising individual voter privacy.

In one embodiment, the Biometric Key Recovery Module 211 enables voters to recover their Secret-Key (S2) without storing it. This is achieved by capturing new biometric samples during each voting session, regenerating the Secret-Key (S2) on-the-fly from these new biometric samples, and verifying the regenerated Secret-Key (S2) against the stored Public-Key (P1).

Now referring to FIG. 3, a method 300 for anonymized authenticated voting is illustrated, in accordance with an embodiment of the present subject matter.

At step 301, the processor 201 may be configured for registering voters over the System 101. This step involves using biometric samples to generate the Secret-Key (S1), Unique-Number (N1), and Public-Key (P1) for each voter. The detailed steps for registering voters over the System 101 are further elaborated with reference to FIG. 4.

At step 302, the processor 201 may be configured for authenticating voters over the System 101 using the first authentication process. This process involves capturing a real-time biometric sample, generating a new Secret-Key (S2), fetching the Public-Key (P1), computing a Real-Time-Unique-Number (N2), and comparing it with the stored Unique-Number (N1). The detailed steps for authenticating voters over the System 101 are further elaborated with reference to FIG. 5.

At step 303, the processor 201 may be configured for searching the Voter Registry to identify a Recorded-Ballot (R1) corresponding to the Public-Key (P1) and checking the Vote-Status (V1). This step ensures that each voter can only cast one vote per election. The detailed steps for this process are further elaborated with reference to FIG. 6.

At step 304, the processor 201 may be configured for providing the authenticated voter with a Voting-Interface displaying the ballot if the Vote-Status (V1) is pending. This step allows the voter to view and interact with the ballot. The process of displaying the Voting-Interface is further illustrated in FIG. 6.

At step 305, the processor 201 may be configured for performing a second authentication process before allowing ballot submission. This step ensures the voter's identity at the point of casting the vote, adding an extra layer of security. The second authentication process is identical to the first and is further elaborated with reference to FIG. 5.

At step 306, the processor 201 may be configured for updating the Vote-Status (V1) to completed in the Recorded-Ballot (R1). This step ensures that the voter cannot cast multiple votes in the same election. The process of updating the voting status is part of the ballot recording process illustrated in FIG. 7.

At step 307, the processor 201 may be configured for saving the ballot with the affixed voter signature and the voter's Public-Key (P1) in a public database as the Recorded-Ballot (R1). This step finalizes the voting process for the individual voter. The detailed steps for capturing and recording the ballot are further illustrated in FIG. 7.

Figure 4:
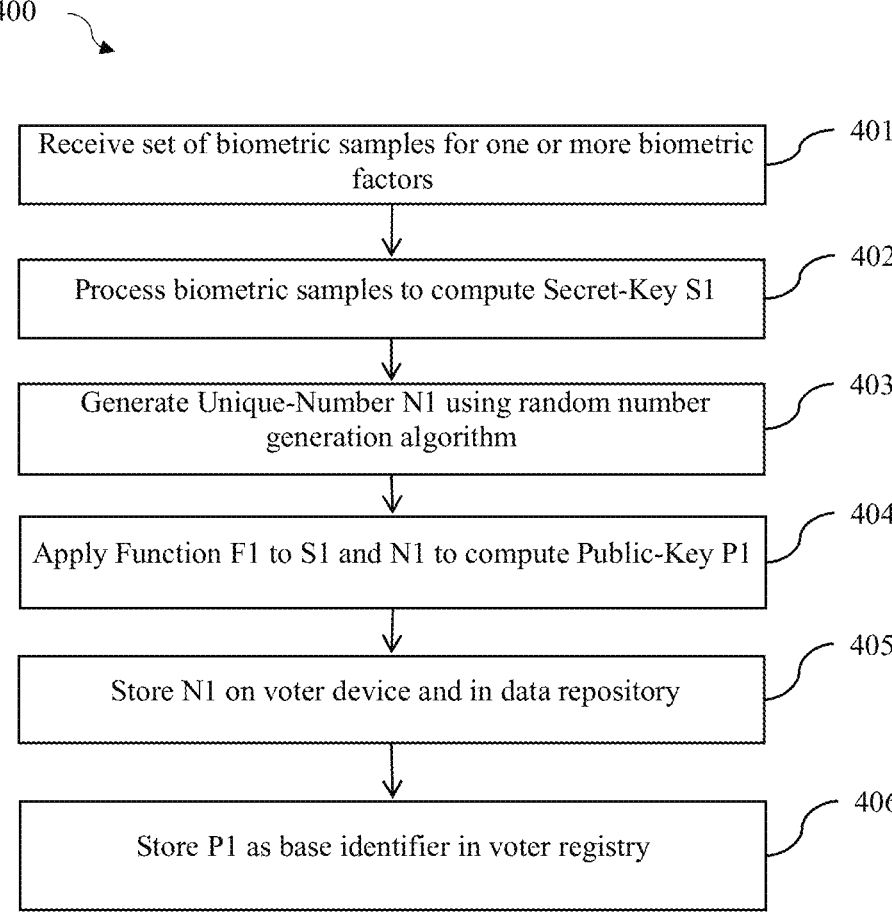
FIG. 4 illustrates a method 400 for voter registration, in accordance with an embodiment of the present disclosure.

Now referring to FIG. 4, a method 400 for voter registration is illustrated, in accordance with an embodiment of the present subject matter.

At step 401, the processor 201 may be configured to receive a set of biometric samples from the voter, corresponding to one or more biometric factors. These biometric factors may include, but are not limited to, facial scans, iris scans, voice patterns, fingerprints, or palm vein patterns. The System 101 may prompt the voter to provide multiple samples of each biometric factor to ensure accuracy and reliability.

At step 402, the processor 201 may be configured to process the set of biometric samples to compute a Secret-Key (S1) corresponding to the voter. This step involves applying sophisticated algorithms to extract unique features from the biometric samples and converting them into a cryptographic key. The Secret-Key (S1) is unique to each voter and serves as a fundamental element in the anonymized authentication process.

At step 403, the processor 201 may be configured to generate a Unique-Number (N1) using a random number generation algorithm. This Unique-Number (N1) adds an additional layer of security to the voter's identity within the System 101. The random number generation algorithm ensures that each voter receives a distinct Unique-Number (N1), further enhancing the system's ability to maintain voter privacy.

At step 404, the processor 201 may be configured to apply a Function (F1) to the Secret-Key (S1) and the Unique-Number (N1) to compute a Public-Key (P1). The Function (F1) is based on Asymmetric Key Encryption and is designed to consume both the Secret-Key (S1) and the Unique-Number (N1) to produce Public-Key (P1). Importantly, Public-Key (P1) is distinct from Secret-Key (S1), ensuring that the voter's biometric information cannot be reverse-engineered from the Public-Key (P1). This step is crucial in maintaining the anonymity of the voter while still allowing for secure authentication.

At step 405, the processor 201 may be configured to store the Unique-Number (N1) on the voter's device and in a secure data repository within the system. Storing Unique-Number (N1) in two locations provides redundancy and allows for verification during the authentication process. The storage on the voter's device enables offline authentication capabilities, while the system's repository serves as a backup and allows for system-wide consistency checks.

At step 406, the processor 201 may be configured to store the Public-Key (P1) as the base identifier of the voter in a Voter Registry. This Voter Registry serves as the central database for all registered voters, but it only contains the Public-Keys, ensuring that no personally identifiable information is stored centrally. The Public-Key (P1) acts as a unique identifier for each voter without revealing any private information, allowing for anonymous yet secure voter management.

This registration process ensures that each voter's identity is securely established within the system while maintaining a high level of privacy and anonymity. By using biometric data to generate cryptographic keys and storing only derived values, the system provides a robust method for voter registration that protects against identity theft and voter fraud while preserving voter privacy.

Figure 5:
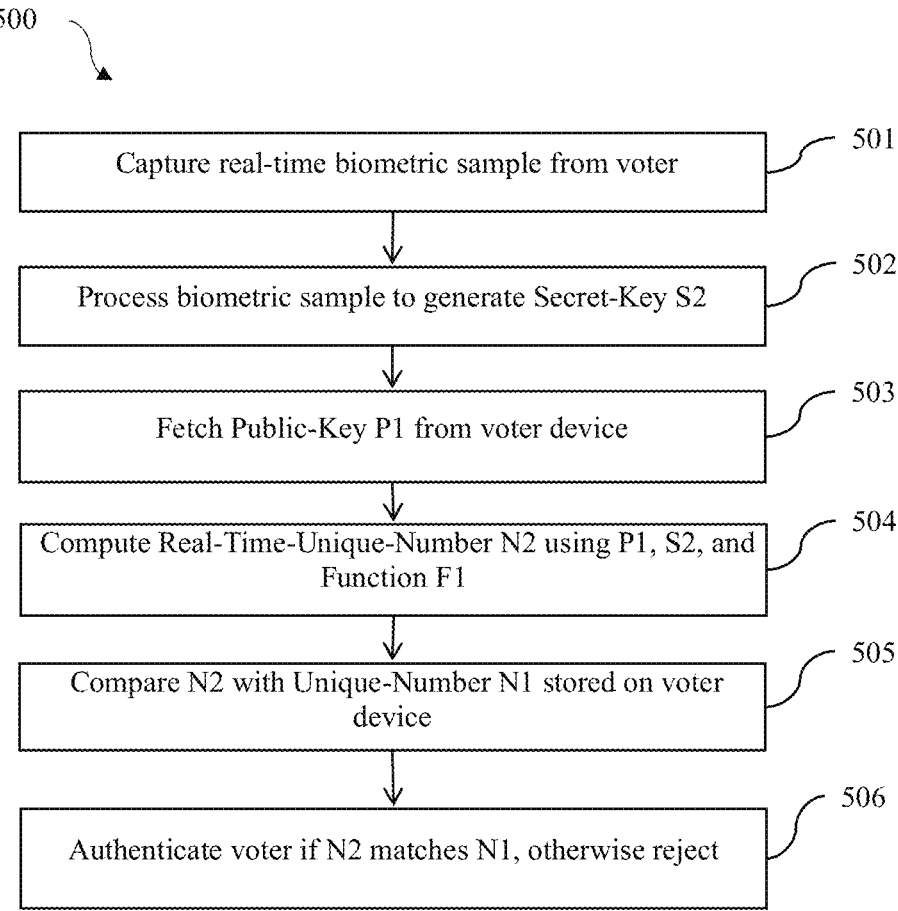
FIG. 5 illustrates a method 500 for voter authentication, in accordance with an embodiment of the present disclosure.

Now referring to FIG. 5, a method 500 for voter authentication is illustrated, in accordance with an embodiment of the present subject matter.

At step 501, the processor 201 may be configured to capture a real-time biometric sample from the voter. This step involves prompting the voter to provide a fresh biometric input, such as a fingerprint scan, facial recognition, iris scan, or voice sample, depending on the biometric factors used during registration. The real-time nature of this capture ensures that the authentication is based on the voter's current presence, mitigating risks associated with replay attacks or the use of pre-recorded biometric data.

At step 502, the processor 201 may be configured to process the captured biometric sample to generate a Secret-Key (S2). This processing involves applying the same algorithms used during registration to extract unique features from the biometric sample and convert them into a cryptographic key. The generation of Secret-Key (S2) occurs in real-time and is not stored, maintaining the security and privacy of the voter's biometric information.

At step 503, the processor 201 may be configured to fetch the Public-Key (P1) from the voter's device. This Public-Key (P1) serves as the voter's unique identifier within the system and was stored on the device during the registration process. Retrieving Public-Key (P1) from the voter's device ensures that the authentication is tied to both the individual and their registered device, adding an extra layer of security.

At step 504, the processor 201 may be configured to compute a Real-Time-Unique-Number (N2) using the Public-Key (P1), the newly generated Secret-Key (S2), and the Function (F1). This computation applies the same asymmetric encryption function used during registration, combining the retrieved Public-Key (P1) and the freshly generated Secret-Key (S1) to produce Real-Time-Unique-Number (N2). This step is crucial in creating a dynamic, real-time identifier for the authentication attempt.

At step 505, the processor 201 may be configured to compare the computed Real-Time-Unique-Number (N2) with the Unique-Number (N1) stored on the voter's device. This comparison is the crux of the authentication process. Unique-Number (N1), which was generated during registration and stored securely on voter device 103, serves as the reference point for verifying the voter's identity.

At step 506, the processor 201 may be configured to authenticate the voter if the computed Real-Time-Unique-Number (N2) matches the stored Unique-Number (N1), or reject the authentication attempt if there is a mismatch. A successful match indicates that the current biometric input corresponds to the registered voter, confirming their identity without revealing or storing any biometric data. In case of a mismatch, the System 101 may allow for a limited number of retry attempts before locking the account to prevent unauthorized access attempts.

This authentication process ensures secure and privacy-preserving voter verification. By generating a Secret-Key (S2) from fresh biometric data for each authentication attempt and comparing derived values rather than raw biometric data, the System 101 maintains a high level of security while protecting voter privacy. The process effectively prevents impersonation and ensures that only legitimate, registered voters can participate in the voting process, all without storing or transmitting sensitive biometric information.

Figure 6:
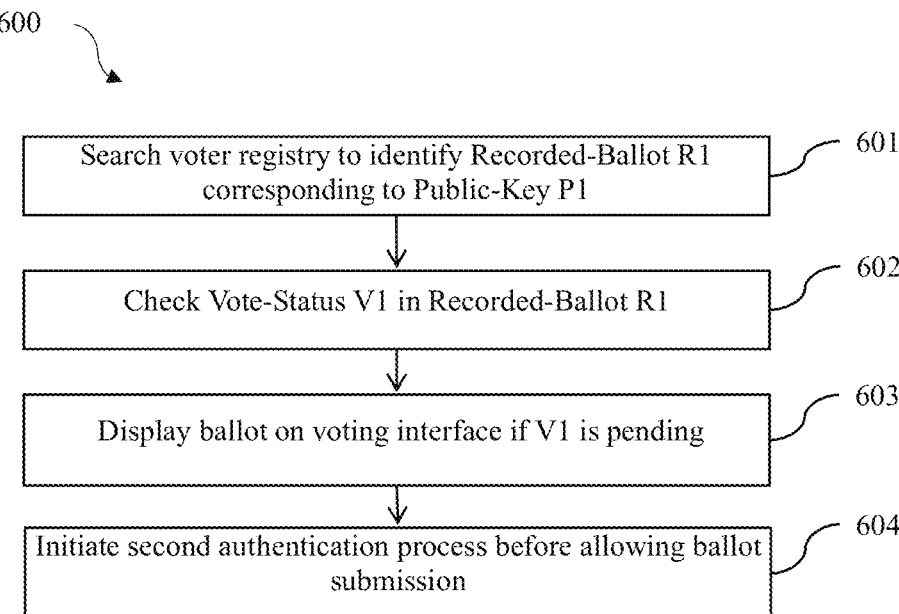
FIG. 6 illustrates a method 600 for providing a Voting-Interface and initiating the voting process, in accordance with an embodiment of the present disclosure.

Now referring to FIG. 6, a method 600 for providing a Voting-Interface is illustrated, in accordance with an embodiment of the present subject matter.

At step 601, the processor 201 may be configured to search the Voter Registry to identify a Recorded-Ballot (R1) corresponding to the Public-Key (P1) of the authenticated voter. This step involves querying the centralized Voter Registry database using the voter's unique Public-Key (P1) as the search parameter. The Voter Registry contains records for all registered voters, with each record associated with a unique Public-Key. This search ensures that only registered voters can access the Voting-Interface, maintaining the integrity of the voting process.

At step 602, the processor 201 may be configured to check the Vote-Status (V1) in the identified Recorded-Ballot (R1). The Vote-Status is a flag within each voter's record that indicates whether the voter has already cast their vote in the current election. This status can have two states: "pending" (indicating the voter has not yet cast a vote) or "completed" (indicating the voter has already cast their vote). This check is crucial in preventing multiple votes from a single voter, ensuring the principle of "one person, one vote" is upheld.

At step 603, the processor 201 may be configured to display the ballot on the Voting-Interface if the Vote-Status (V1) is pending. If the status check reveals that the voter has not yet cast their vote, the system proceeds to present the appropriate ballot to the voter. The ballot displayed is specific to the election and may include candidate names, referendum questions, or other voting options relevant to the current election. The interface is designed to be user-friendly and accessible, ensuring that voters can easily understand and interact with the ballot.

At step 604, the processor 201 may be configured to initiate a second authentication process before allowing ballot submission. This additional authentication step adds an extra layer of security at the critical moment of vote casting. The second authentication process is identical to the initial authentication described in FIG. 5, involving the capture of a fresh biometric sample, generation of a new Secret-Key, computation of a Real-Time-Unique-Number (N2), and comparison with the stored Unique-Number (N1). This step ensures that the person submitting the ballot is indeed the same authenticated voter who initiated the voting process, preventing any potential interference or unauthorized access between the initial authentication and the actual vote submission. This method for providing the Voting-Interface ensures that only eligible, authenticated voters can access and submit ballots, while also preventing multiple voting. The combination of checking the Vote-Status and requiring a second authentication before ballot submission creates a robust system that maintains the integrity of the election process. Furthermore, by using the Public-Key (P1) as the primary identifier and not storing or displaying any personally identifiable information during this process, the System 101 continues to uphold the principles of voter privacy and anonymity throughout the voting experience.

Figure 7:
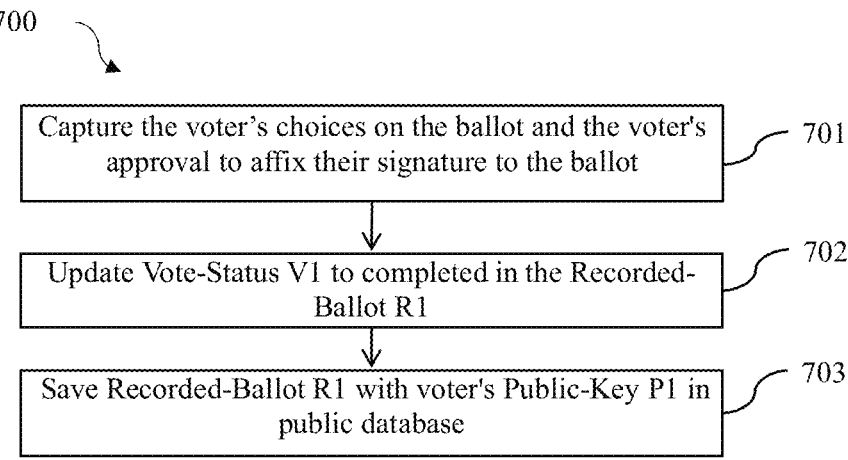
FIG. 7 illustrates a method 700 for capturing and recording a voter's ballot, without revealing the voter's identity, in accordance with an embodiment of the present disclosure.

Now referring to FIG. 7, a method 700 for capturing and recording a ballot is illustrated, in accordance with an embodiment of the present subject matter.

At step 701, the processor 201 may be configured to capture, via the Voting-Interface, the voter's choices on the ballot and the voter's approval to affix their signature to the ballot. This step involves presenting the voter with a clear and explicit prompt to confirm their ballot choices and agree to submit their vote. The signature in this context is a digital representation of the voter's consent, rather than a traditional handwritten signature. This digital signature is generated using the voter's Public-Key (P1) and the contents of their ballot, creating a unique, verifiable record of the voter's choices without revealing their identity.

At step 702, the processor 201 may be configured to update the Vote-Status (V1) to "completed" in the voter's Recorded-Ballot (R1) within the Voter Registry. This crucial step marks the successful completion of the voting process for the individual voter. By updating the status to "completed," the System 101 ensures that each voter can only cast one vote per election, preventing any attempts at multiple voting. This status update is performed in the secure Voter Registry, separate from the public database where the actual votes are recorded, maintaining the separation between voter authentication and vote content.

At step 703, the processor 201 may be configured to save the Recorded-Ballot (R1) with the voter's Public-Key (P1) in a public database. The Recorded-Ballot (R1) may be designed to be transparent and immutable, often implemented using blockchain technology to ensure the integrity and traceability of all recorded votes. The ballot, along with its digital signature, is stored in association with the voter's Public-Key (P1). This approach allows for public verification of the vote while maintaining voter anonymity, as the Public-Key (P1) cannot be traced back to the voter's personal identity. The use of a public database ensures that all votes are recorded in a manner that is resistant to tampering or manipulation.

This method for capturing and recording ballots ensures the integrity, anonymity, and verifiability of the voting process. By capturing the voter's approval, storing the signed ballot in a public database, and updating the Vote-Status, the System 101 creates a robust record of each vote cast. The use of the voter's Public-Key (P1) as the linking identifier between the ballot and the voter record maintains anonymity while still allowing for individual vote verification.

Moreover, this approach allows for various post-election processes such as audits, recounts, or individual vote verification, all without compromising voter privacy. Voters can potentially use their Public-Key (P1) to check that their vote was recorded correctly in the public database, while election officials can tally and verify votes without accessing any voter's personal information.

The combination of a transparent, public record of all cast ballots with a secure, private Voter Registry creates a system that is both highly secure against fraud and fully respectful of voter privacy. This method strikes a balance between the need for election integrity and the fundamental right to a secret ballot, leveraging cryptographic techniques to achieve both goals simultaneously.

Now referring to FIG. 8, a method 800 for vote verification and counting is illustrated, in accordance with an embodiment of the present subject matter.

At step 802, the processor 201 may be configured to receive a verify button click from the voter. This step initiates the vote verification process, ensuring that the voter actively requests to verify their vote. The "verify button" could be a clearly labelled button on the interface that says "Verify My Vote" or "Check My Ballot." When the voter clicks this button, it triggers the subsequent verification steps.

At step 803, the processor 201 may be configured to perform a third authentication process for authenticating the voter. This authentication process is identical to the second authentication process used during vote casting. It involves:
a) Capturing a real-time biometric sample (e.g., facial recognition or fingerprint scan)

b) Generating a Secret-Key (S2) from this biometric sample
c) Fetching the Public-Key (P1) associated with the voter
d) Computing a Real-Time-Unique-Number (N2) using the Public-Key (P1), Secret-Key (S2), and the Function (F1)
e) Authenticating the voter by comparing the computed Real-Time-Unique-Number (N2) with the stored Unique-Number (N1)

This multi-step process ensures that only the legitimate voter can access their ballot information.

At step 804, the processor 201 may be configured to fetch the Public-Key (P1) corresponding to the voter from the public database. The Public-Key (P1) serves as a unique identifier for each voter's ballot without revealing their identity. For instance, if a voter's Public-Key (P1) is "ABC123", the system would retrieve this key from the database to use in the next step.

At step 805, the processor 201 may be configured to retrieve the corresponding Recorded-Ballot (R1) from the public database based on the Public-Key (P1) corresponding to the voter. This involves searching the Recorded-Ballot (R1) on the database (which may be blockchain-based) to locate the specific ballot associated with the voter's Public-Key (P1). For example, using the Public-Key "ABC123", the system would find and retrieve the ballot data linked to this key.

At step 806, the processor 201 may be configured to display the ballot details to the voter. The interface shows the voter their recorded choices, allowing them to confirm that their vote was captured and stored correctly, while maintaining the anonymity of the voting process. For instance, it might show: "Candidate A: Selected, Proposition 1: Yes, Proposition 2: No" without any identifying information about the voter.

At step 807, the processor 201 may be configured to continuously update voting results recorded in the public database. This ongoing tallying process ensures that vote counts are updated in real-time as new ballots are added to the database. For example, every time a new vote is cast and recorded, the system immediately adds it to the running totals for each candidate and proposition.

At step 808, the processor 201 may be configured to update real-time vote counts and statistics for all candidates and propositions. As votes are tallied, the system calculates and updates the total votes for each candidate or voting option. For instance, if Candidate A receives a new vote, their total would immediately increase from 10,000 to 10,001.

At step 809, the processor 201 may be configured to publish the results in real-time. The system presents overall vote counts without linking any results to individual voters, ensuring that the privacy of individual votes is maintained even as comprehensive election results are made available. This could be visualized as a live-updating chart or table showing the current vote totals and percentages for each candidate and proposition.

At step 810, the processor 201 may be configured to enable Secret-Key (S2) recovery using new biometric samples. This feature allows voters to regenerate their Secret-Key if needed, such as when using a new device or if their original device is lost or damaged. The process involves:
f) Capturing new biometric samples during each voting session. For example, the voter might be asked to provide a new fingerprint scan or facial recognition sample.

g) Regenerating the Secret-Key (S2) on-the-fly from the new biometric samples. This uses the same algorithm as the initial registration process to create a new Secret-Key from the biometric data.

h) Verifying the regenerated Secret-Key (S2) against the stored Public-Key (P1). This step ensures that the newly generated Secret-Key corresponds to the voter's registered Public-Key.

For instance, if a voter loses their phone and needs to vote from a new device, they could use this feature to re-establish their voting credentials without compromising the security of the system.

Although implementations for the system 101 and the method 300 for anonymized authenticated voting, have been described in language specific to structural features and methods, it must be understood that the claims are not limited to the specific features or methods described. Rather, the specific features and methods are disclosed as examples of implementations for the system 101 and the method 300 for anonymized authenticated voting.

The invention claimed is:

1. A system for anonymized authenticated voting, comprising:

a memory; and a processor coupled to the memory, wherein the processor is configured to execute instructions stored in the memory for:

registering each voter, from a set of voters by,
receiving a set of biometric samples of a voter,
corresponding to one or more biometric factors,
processing the set of biometric samples to compute a Secret-Key (S1) corresponding to the voter,
generating a Unique-Number (N1) using a random number generation algorithm,
applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1),
storing the Unique-Number (N1) on a voter device and in a data repository, and
storing the Public-Key (P1) as a base identifier of the voter, in a Voter Registry;
authenticating the voter via a first authentication process, wherein the first authentication process comprises steps of
receiving a biometric sample captured from the voter in real-time,
processing the biometric sample to generate a Secret-Key (S2),
fetching the Public-Key (P1) corresponding to the voter from a voter device,
computing a Real-Time-Unique-Number (N2) using the Public-Key (P1), the Secret-Key (S2) and the Function (F1), and
authenticating the voter based on comparison of the Real-Time-Unique-Number (N2) with the Unique-Number (N1) stored on the voter device;
searching the Voter Registry to identify a Recorded-Ballot (R1) corresponding to the Public-Key (P1), wherein the Recorded-Ballot (R1) comprises a Vote-Status (V1), wherein the Vote-Status (V1) is either pending or completed;
providing the authenticated voter a Voting-Interface, when the Vote-Status (V1) is pending;

displaying, on the Voting-Interface, a ballot;
initiating a second authentication process, wherein the second authentication process comprises steps of
receiving a biometric sample captured from the voter in real-time,
processing the biometric sample to generate a Secret-Key (S2),
fetching the Public-Key (P1) corresponding to the voter from the voter device,
computing a Real-Time-Unique-Number (N2) using the Public-Key (P1), the Secret-Key (S2) and the Function (F1), and
authenticating the voter based on comparison of the Real-Time-Unique-Number (N2) with the Unique-Number (N1) stored on the voter device;
capturing, via the Voting-Interface, the voter's choices on the ballot and the voter's approval to affix the voter's signature on the ballot;
updating the Vote-Status (V1) to completed; and
saving the ballot with the affixed voter signature and the voter's Public-Key (P1) in a public database as the Recorded-Ballot (R1).

2. The system of claim 1, wherein the voter's signature is comprised of a combination of a Button-Click-Event-Log corresponding to a Signature-Button and the Real-Time-Unique-Number (N2).

3. The system of claim 1, wherein the Recorded-Ballot (R1) is optionally implemented as a blockchain.

4. The system of claim 1, further comprising:
providing a Recorded-Ballot-Verification-Interface configured for:
receiving a verify button click from the voter,
performing a third authentication process for authenticating the voter, wherein the steps of the third authentication process are the same as the second authentication process,
fetching the Public-Key (P1) corresponding to the voter from the public database,
retrieving the corresponding Recorded-Ballot (R1) from the public database based on the Public-Key (P1) corresponding to the voter, and
displaying ballot details to the voter.

5. The system of claim 1, further comprising:
generating real-time vote counting and statistics by:
continuously updating voting results recorded in the public database,
updating vote counts for all candidates and propositions, and
publishing results in real-time.

6. The system of claim 1, wherein the biometric sample allows deriving the Secret-Key (S2) without storing the Secret-Key (S2), enabling voters to recover their Secret-Key (S2) by:
capturing new biometric samples during each voting session,
regenerating the Secret-Key (S2) on-the-fly from the new biometric samples, and
verifying the regenerated Secret-Key (S2) against the stored Public-Key (P1).

7. A method for anonymized authenticated voting, comprising steps of:
registering each voter, from a set of voters by,
receiving a set of biometric samples of a voter,
corresponding to one or more biometric factors,
processing the set of biometric samples to compute a Secret-Key (S1) corresponding to the voter, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a voter device and in a data repository, and storing the Public-Key (P1) as a base identifier of the voter, in a Voter Registry;

authenticating the voter via a first authentication process, wherein the first authentication process comprises steps of receiving a biometric sample captured from the voter in real-time, processing the biometric sample to generate a Secret-Key (S2), fetching the Public-Key (P1) corresponding to the voter from a voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device;

searching the Voter Registry to identify a Recorded-Ballot (R1) corresponding to the Public-Key (P1), wherein the Recorded-Ballot (R1) comprises a Vote-Status (V1), wherein the Vote-Status (V1) is either pending or completed;

providing the authenticated voter a Voting-Interface, when the Vote-Status (V1) is pending;

displaying, on the Voting-Interface, a ballot;

initiating a second authentication process, wherein the second authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device;

capturing, via the Voting-Interface, the voter's choices on the ballot and the voter's approval to affix the voter's signature to the ballot;

updating the Vote-Status (V1) to completed; and saving the ballot with the affixed voter signature and the voter's Public-Key (P1) in a public database as the Recorded-Ballot (R1).

8. The method of claim 7, wherein the voter's signature is comprised of a combination of a Button-Click-Event-Log corresponding to a Signature-Button and the Real-Time-Unique-Number (N2).

9. The method of claim 7, wherein the Recorded-Ballot (R1) is optionally implemented as a blockchain.

10. The method of claim 7, further comprising:

providing a Recorded-Ballot-Verification-Interface configured for:

receiving a verify button click from the voter, performing a third authentication process for authenticating the voter, wherein the steps of the third authentication process are the same as the second authentication process, fetching the Public-Key (P1) corresponding to the voter from the public database, retrieving the corresponding Recorded-Ballot (R1) from the public database based on the Public-Key (P1) corresponding to the voter, and displaying ballot details to the voter.

11. The method of claim 7, further comprising:

generating real-time vote counting and statistics by:

continuously updating voting results recorded in the public database, updating vote counts for all candidates and propositions, and publishing results in real-time.

12. The method of claim 7, wherein the biometric sample allows deriving the Secret-Key (S2) without storing the Secret-Key (S2), enabling voters to recover their Secret-Key (S2) by:

capturing new biometric samples during each voting session, regenerating the Secret-Key (S2) on-the-fly from the new biometric samples, and verifying the regenerated Secret-Key (S2) against the stored Public-Key (P1).

13. A computer program product for anonymized authenticated voting, the computer program product comprising a non-transitory computer-readable storage medium having program instructions embodied therewith, the program instructions executable by one or more processors to cause the one or more processors to perform operations comprising:

registering each voter, from a set of voters by, receiving a set of biometric samples of a voter, corresponding to one or more biometric factors, processing the set of biometric samples to compute a Secret-Key (S1) corresponding to the voter, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a voter device and in a data repository, and storing the Public-Key (P1) as a base identifier of the voter, in a Voter Registry;

authenticating the voter via a first authentication process, wherein the first authentication process comprises steps of receiving a biometric sample captured from the voter in real-time, processing the biometric sample to generate a Secret-Key (S2), fetching the Public-Key (P1) corresponding to the voter from a voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device;

searching the Voter Registry to identify a Recorded-Ballot (R1) corresponding to the Public-Key (P1), wherein the Recorded-Ballot (R1) comprises a Vote-Status (V1), wherein the Vote-Status (V1) is either pending or completed;

providing the authenticated voter a Voting-Interface, when the Vote-Status (V1) is pending;

displaying, on the Voting-Interface, a ballot;

initiating a second authentication process, wherein the second authentication process comprises steps of receiving a biometric sample captured from the voter in real-time, processing the biometric sample to generate a Secret-Key (S2), fetching the Public-Key (P1) corresponding to the voter from the voter device, computing a Real-Time-Unique-Number (N2) using the Public-Key (P1), the Secret-Key (S2) and the Function (F1), and authenticating the voter based on comparison of the Real-Time-Unique-Number (N2) with the Unique-Number (N1) stored on the voter device;

capturing, via the Voting-Interface, the voter's choices on the ballot and the voter's approval to affix the voter's signature to the ballot;

updating the Vote-Status (V1) to completed; and saving the ballot with the affixed voter signature and the voter's Public-Key (P1) in a public database as the Recorded-Ballot (R1).

* * * * *